(12) United States Patent
Kazeto

(10) Patent No.: US 9,714,327 B2
(45) Date of Patent: Jul. 25, 2017

(54) RESIN COMPOSITION AND MULTILAYER STRUCTURE USING SAME

(71) Applicant: Kuraray Co., Ltd., Kurashiki-shi (JP)

(72) Inventor: Osamu Kazeto, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 15/134,957

(22) Filed: Apr. 21, 2016

(65) Prior Publication Data

US 2016/0237224 A1 Aug. 18, 2016

Related U.S. Application Data

(63) Continuation of application No. 12/991,757, filed as application No. PCT/JP2010/055594 on Mar. 29, 2010, now abandoned.

(30) Foreign Application Priority Data

Apr. 1, 2009 (JP) ................... 2009-089133

(51) Int. Cl.

| | | |
|---|---|---|
| C08J 3/22 | (2006.01) | |
| C08L 23/02 | (2006.01) | |
| C08L 23/08 | (2006.01) | |
| B29C 47/06 | (2006.01) | |
| C08L 23/12 | (2006.01) | |
| C08L 29/04 | (2006.01) | |
| C08K 5/098 | (2006.01) | |
| C08J 3/00 | (2006.01) | |
| B29K 23/00 | (2006.01) | |

(52) U.S. Cl.
CPC ............. C08J 3/226 (2013.01); B29C 47/065 (2013.01); C08J 3/005 (2013.01); C08L 23/02 (2013.01); C08L 23/0853 (2013.01); C08L 23/0861 (2013.01); C08L 23/12 (2013.01); B29K 2023/0633 (2013.01); B29K 2023/083 (2013.01); B29K 2023/086 (2013.01); C08J 2323/12 (2013.01); C08J 2423/00 (2013.01); C08J 2423/06 (2013.01); C08J 2423/08 (2013.01); C08J 2429/04 (2013.01); C08J 2431/00 (2013.01); C08J 2431/04 (2013.01); C08K 5/098 (2013.01); C08L 29/04 (2013.01); C08L 2205/02 (2013.01); C08L 2205/035 (2013.01); C08L 2205/06 (2013.01); C08L 2205/08 (2013.01); C08L 2207/066 (2013.01); C08L 2310/00 (2013.01); Y10T 428/31928 (2015.04)

(58) Field of Classification Search
CPC .... C08J 3/226; C08J 2423/00; C08J 2423/08; C08J 2429/04; C08J 2431/00; C08J 3/005; C08J 2323/12; C08J 2423/06; C08J 2431/04; C08L 23/02; C08L 23/0853; C08L 23/0861; C08L 29/04; C08L 2205/02; C08L 23/12; C08L 2205/035; C08L 2205/06; C08L 2205/08; C08L 2207/066; C08L 2310/00; B29K 2023/0633; B29K 2023/083; B29K 2023/086; C08K 5/098; B29C 47/065; Y10T 428/31928

See application file for complete search history.

(56) References Cited

U.S. PATENT DOCUMENTS

| | | |
|---|---|---|
| 3,857,754 A | 12/1974 | Hirata et al. |
| 3,932,692 A | 1/1976 | Hirata et al. |
| 5,054,594 A | 10/1991 | Kampf et al. |
| 5,082,743 A | 1/1992 | Itamura et al. |
| 5,128,410 A | 7/1992 | Ilendra |
| 5,389,709 A | 2/1995 | Itamura et al. |
| 5,399,619 A | 3/1995 | Torradas et al. |
| 5,466,748 A | 11/1995 | Ikeda et al. |
| 5,492,953 A | 2/1996 | Itamura et al. |
| 5,498,664 A | 3/1996 | Kotani et al. |
| 5,744,547 A | 4/1998 | Moritani et al. |

(Continued)

FOREIGN PATENT DOCUMENTS

| | | |
|---|---|---|
| JP | 60-199040 | 10/1985 |
| JP | 3-72539 | 3/1991 |

(Continued)

OTHER PUBLICATIONS

International Search Report issued in PCT/JP2010/055594 filed Mar. 29, 2010.

(Continued)

*Primary Examiner* — Kevin R Kruer

(74) *Attorney, Agent, or Firm* — Oblon, McClelland, Maier & Neustadt, L.L.P.

(57) ABSTRACT

A method of making a resin composition comprising; a polyolefin (A); a saponified ethylene-vinyl acetate copolymer (EVOH) (B) having an ethylene content of 20-65 mol % and a degree of saponification of 96% or more; a higher fatty acid metal salt (C) having 8 to 22 carbon atoms; a conjugated polyene compound (D) having a boiling point of 20° C. or higher; an ethylene-vinyl acetate copolymer (E); and a saponified ethylene-vinyl acetate copolymer (F) having an ethylene content of 68-98 mol % and a degree of saponification of 20% or more, wherein the mass ratio (A:B) is 60:40 to 99.9:0.1, the amount of the higher fatty acid metal salts (C) is in the range of 0.0001 to 10 pbm per 100 pbm of the total of the polyolefin (A) and the EVOH (B), the amount of conjugated polyene compound (D) is in the range of 0.000001 to 1 pbm, and the total amount of the ethylene-vinyl acetate copolymer (B) and the saponified ethylene-vinyl acetate copolymer (F) is 0.3 pbm or more.

7 Claims, No Drawings

(56) References Cited

U.S. PATENT DOCUMENTS

| | | |
|---|---|---|
| 5,804,270 A | 9/1998 | Kawamura et al. |
| 6,242,087 B1 | 6/2001 | Kawai |
| 6,258,464 B1 | 7/2001 | Negi et al. |
| 6,753,370 B2 | 6/2004 | Nakatsukasa et al. |
| 8,283,416 B2 | 10/2012 | Beniya et al. |
| 2010/0255330 A1 | 10/2010 | Ninomiya et al. |

FOREIGN PATENT DOCUMENTS

| | | |
|---|---|---|
| JP | 03-072542 | 3/1991 |
| JP | 3-192140 | 8/1991 |
| JP | 06-087195 | 3/1994 |
| JP | 9-71620 | 3/1997 |
| JP | 09-71620 | 3/1997 |
| JP | 09-278952 | 10/1997 |
| JP | 10-001569 | 1/1998 |
| JP | 10-001570 | 1/1998 |
| JP | 2000-212454 | 8/2000 |
| JP | 2001-049069 | 2/2001 |
| JP | 2003-104427 | 4/2003 |
| JP | 2008-115367 | 5/2008 |
| WO | WO 2009/041440 A1 | 4/2009 |

OTHER PUBLICATIONS

Extended Search Report issued Feb. 18, 2011 in Europe Application No. 10729268.2.

RESIN COMPOSITION AND MULTILAYER STRUCTURE USING SAME

CROSS-REFERENCE TO RELATED APPLICATIONS

The present application is a continuation of U.S. Ser. No. 12/991,757, filed on Nov. 9, 2010, which is a National Stage (371) of PCT/JP10/055594, filed on Mar. 29, 2010, and claims priority to JP 2009-089133, filed Apr. 1, 2009.

TECHNICAL FIELD

The present invention relates to a resin composition comprising a polyolefin, and a saponified ethylene-vinyl acetate copolymer (may be abbreviated as EVOH hereinafter) which is improved in preventing the formation of film surface anomalies arising from insufficient dispersion of EVOH at the time of melt molding the resin compositions, more specifically to a resin composition which is improved in formation of EVOH aggregates at a micro-scale level and formation of wavy patterns on the surface of molded articles; and relates also to a multilayer structure including a layer comprising such a resin composition.

BACKGROUND ART

Resin compositions made by blending polyolefins and EVOH are well known (see Patent Document 1). However, these resin compositions are generally poor in compatibility with each other and, hence, when formed into film, sheet, bottle or the like by extrusion molding, the compositions tend to generate nonuniform phase-separated foreign matters. The number of the foreign matters increases particularly during long periods of operation and the appearance of the molded articles is significantly impaired (reduction of long-run processability). Additional problems, such as formation of lip stain around the die exit at the time of the extrusion process of the resin compositions, are also known. This lip stain can become mixed in the molded articles, lowering their quality.

It is known that blending higher fatty acid metal salts having 8 to 22 carbon atoms, ethylenediaminetetraacetate metal salts, and/or such as hydrotalcite compounds is effective in improving the insufficient compatibility between polyolefin and EVOH (see Patent Documents 1 and 2). In addition to the combination, it is disclosed that, in addition to blending hydrotalcite based compounds and higher fatty acid metal salts having 8 carbon atoms or more in the mixture of a polyolefin and an EVOH, the addition of boron compounds, phosphoric acids and/or alkali (alkali-earth) hydrogen phosphates, or lower fatty acid metal salts having 7 carbon atoms or less, or the like, improves long-run processability and heat resistance of compositions mainly comprising a polyolefin and an EVOH at the time of melt molding (physical property retention at repeated heating accompanying recycling) (see Patent Documents 3, 4 and 5). In these documents, however, the evaluation of fish-eye formation at the time of film molding is done by observing the number of fish-eye particles having a diameter of 0.2 mm or more formed per 100 $cm^2$.

It is also disclosed that saponified ethylene-vinyl acetate copolymers having an ethylene content of 68 to 98 mol % and having a degree of saponification of vinyl acetate units of 20% or more (may be abbreviated as S-EVOH hereinafter) may be blended as resin compositions capable of preventing wavy pattern formation on the molded articles surface in addition to using at least one component selected from higher fatty acid metal salts having 8 to 22 carbon atoms, ethylenediaminetetraacetate metal salts, and hydrotalcites described above to a polyolefin and an EVOH, at the time of melt-molding resin compositions comprising a polyolefin and an EVOH. The wavy patterns arise from flow anomalies due to insufficient compatibility at the time of melt molding. In this manner, the compatibility of the obtained resin compositions is improved and the wavy patterns on the molded article surface are prevented, and thus the effective reuse of scrap compositions such as regrinds is disclosed (see Patent Document 6).

It has also been disclosed that by adding an acid graft-modified polyolefin based resin and a polyalcohol compound to recycled materials of layered products including thermoplastic resin layers and EVOH layers, the resin compositions showing no gelation at the time of melt molding, producing no wavy patterns or fish-eyes on the molded articles, having an excellent long-run processability, and capable of preventing the phase-separated foreign matter (lip stain), can be obtained (see Patent Document 7). However, in this document, evaluation of fish-eye formation is done by observing the number of fish-eye particles having a diameter of 0.4 mm or more formed per 100 $cm^2$ in the regrind layer of the layered products.

In addition, a method for manufacturing vinyl acetate based polymers by the addition of a conjugated polyene compound having a boiling point of 20° C. or more to an ethylene-vinyl acetate copolymer, and a method for manufacturing saponified vinyl acetate based polymers by the saponification of the vinyl acetate based polymers obtained in this method, have also been disclosed. EVOH obtained by these methods is considered of high quality showing minimal coloration and minimal formation of gel-like hard spots at the time of molding (see Patent Document 8).

Also, resin compositions made by blending EVOH with an ethylene-vinyl acetate copolymer having an ethylene content of 60 to 98 mol % and S-EVOH, and multilayer structures consisting of at least 2 layers including the resin composition layers, have been disclosed. According to this reference, resin compositions having excellent gas barrier properties and improved flexibility and transparency can be obtained (see Patent Document 9).

According to the arts disclosed in Patent Documents 2 to 7, compatibility between EVOH and polyolefin in the resin compositions made by blending polyolefin and EVOH can be greatly improved, resulting in improved appearance of the molded articles. However, in the current environment-responsive trend (volume reduction of packaging materials and waste materials), demand for thinning of cups, bottles and films is on the increase. Therefore, the need for reducing the poor appearance due to insufficient dispersion at a more micro-scale level and flow anomalies of resin compositions made by blending polyolefin and EVOH is also increasing. For traditional packaging materials, which were relatively thick, there were no such problems because of the low transparency and the like. In Patent Document 8, the art of reducing the gel-like hard spots in molded articles made of EVOH alone is disclosed. In Patent Document 9, the art of improving the flexibility of molded articles made mainly of EVOH alone is disclosed. No mention or hint of resin compositions made by blending EVOH and polyolefin is found in Patent Documents 8 and 9.

PRIOR ART DOCUMENTS

Patent Document

[Patent Document 1]
Laid-open Japanese patent publication No. S60-199040
[Patent Document 2]
Laid-open Japanese patent publication No. H6-87195
[Patent Document 3]
Laid-open Japanese patent publication No. H10-001569
[Patent Document 4]
Laid-open Japanese patent publication No. H10-001570
[Patent Document 5]
Laid-open Japanese patent publication No. H09-278952
[Patent Document 6]
Laid-open Japanese patent publication No. H03-72542
[Patent Document 7]
Laid-open Japanese patent publication No. 2008-115367
[Patent Document 8]
Laid-open Japanese patent publication No. H09-71620
[Patent Document 9]
Laid-open Japanese patent publication No. H03-192140

SUMMARY OF INVENTION

Problems to be Solved by the Invention

The present inventors have found that the film surface anomalies, which appear at the time of melt molding the resin composition made by blending a polyolefin and an EVOH, and which impair the appearance, are caused by insufficient dispersion of EVOH, or more specifically, the formation of EVOH aggregates at a micro-scale level.

Accordingly, the objects of the present invention are to improve the dispersibility of EVOH by suppressing the formation of aggregates at a micro-scale level, to reduce the occurrences of poor appearance such as wavy patterns on the molded article surface caused by flow anomalies due to the aggregates, and thus to effectively reuse the layered product comprising the polyolefin layer and the EVOH layer, or other such as scrap portion, as a regrind layer, and finally to obtain molded articles with good appearance.

Means for Solving the Problem

According to the present invention, the above-described object can be achieved by providing a resin composition comprising: a polyolefin (A); a saponified ethylene-vinyl acetate copolymer (B) having an ethylene content of 20 to 65 mol % and having a degree of saponification of vinyl acetate units of 96% or more (hereinafter simply, "EVOH (B)"); a higher fatty acid metal salt (C) having 8 to 22 carbon atoms (hereinafter simply, "higher fatty acid metal salt (C)"); a conjugated polyene compound (D) having a boiling point of 20° C. or higher (hereinafter simply, "conjugated polyene compound (D)"); an ethylene-vinyl acetate copolymer (E) (hereinafter, "EVAc (E)"); and a saponified ethylene-vinyl acetate copolymer (F) having an ethylene content of 68 to 98 mol % and having a degree of saponification of vinyl acetate units of 20% or more (hereinafter, "S-EVOH (F)"), wherein the mass ratio (A:B) of the polyolefin (A) and the EVOH (B) is 60:40 to 99.9:0.1, the amount of higher fatty acid metal salts (C) is in the range of 0.0001 to 10 parts by mass per 100 parts by mass of the total of polyolefin (A) and EVOH (B), the amount of conjugated polyene compound (D) is in the range of 0.000001 to 1 part by mass per 100 parts by mass of the total of polyolefin (A) and EVOH (B), and the total amount of an EVAc (E) and the S-EVOH (F) is 0.3 part by mass or more per 100 parts by mass of the total of polyolefin (A) and EVOH (B).

In the resin composition, it is a preferable embodiment of the present invention that the mass ratio (E:F) between the ethylene-vinyl acetate copolymer (E) and the saponified ethylene-vinyl acetate copolymer (F) is in the range of 99.9:0.1 to 70.0:30.0.

In the resin composition, preferably, a master batch is prepared in advance by melt-blending the higher fatty acid metal salt (C) having 8 to 22 carbon atoms, the ethylene-vinyl acetate copolymer (E), and the saponified ethylene-vinyl acetate copolymer (F), and the resin composition is obtained by melt-blending the master batch, the polyolefin (A), the saponified ethylene-vinyl acetate copolymer (B), and the conjugated polyene compound (D) having a boiling point of 20° C. or higher.

Preferably, a master batch is prepared in advance by melt-blending the polyolefin (A), the higher fatty acid metal salt (C), the EVAc (E), and the S-EVOH (F), and the resin compositions are obtained by melt-blending the master batch, the polyolefin (A), the EVOH (B), and the conjugated polyene compound (D).

It is a preferable embodiment in the resin composition according to the present invention that the master batch (obtained above) analyzed by nuclear magnetic resonance spectroscopy ($^1$H-NMR) method shows a signal strength ratio (Ja:Jb) between the signal Ja deriving from the hydrogen atoms bonded to the carbon atoms to which acetoxy groups are bonded, and the signal Jb deriving from the hydrogen atoms bonded to the carbon atoms to which hydroxyl groups are bonded, in the range of 99.5:0.5 to 70.0:30.0.

A resin composition obtained as follows is also a preferable embodiment of the present invention: a resin composition obtained by further containing in the above resin composition a hydrotalcite (G) in the range of 0.0001 to 10 parts by mass per 100 parts by mass of the total of the polyolefin (A) and the EVOH (B).

A preferable embodiment of the present invention also is a multilayer structure having at least two layers comprising a layer made of any one of the above-described resin compositions, and a layer made of a saponified ethylene-vinyl acetate copolymer having an ethylene content of 20 to 65 mol % and having a degree of saponification of vinyl acetate units of 96% or more.

Advantageous Effects of Invention

The present invention offers resin compositions capable of suppressing the formation of EVOH aggregates at the micro-scale levels to improve the dispersibility and reducing the occurrences of flow anomalies caused by the aggregates. The resin composition of the present invention can be used as a recycled regrind layer even from scraps, etc., of layered products having the polyolefin layer and the EVOH layer. Even in this case, molded articles without defects in the appearance can be obtained.

DESCRIPTION OF EMBODIMENTS

The resin composition of the present invention contains polyolefin (A), EVOH (B), higher fatty acid metal salt (C), conjugated polyene compound (D), EVAc (E), and S-EVOH (F). The mass ratio of polyolefin (A) and EVOH (B), (A:B), is 60:40 to 99.9:0.1. The amount of higher fatty acid metal salts (C) contained is in the range of 0.0001 to 10 parts by mass per 100 parts by mass of the total of polyolefin (A) and EVOH (B). The amount of conjugated polyene compound (D) is in the range of 0.000001 to 1 part by mass per 100 parts by mass of the total of polyolefin (A) and EVOH (B). The total amount of EVAc (E) and S-EVOH (F) contained is 0.3 part by mass or more per 100 parts by mass of the total of polyolefin (A) and EVOH (B).

Polyolefin (A) used in the present invention includes polyethylene (low density, linear low density, medium density, and high density); ethylene based copolymers prepared by copolymerization of ethylene and α-olefins such as 1-butene, 1-hexene and 4-methyl-1-pentene or acrylic esters; polypropylene (homo polypropylene, random polypropylene, block polypropylene, etc.); propylene based copolymers prepared by copolymerization of propylene and α-olefins such as ethylene, 1-butene, 1-hexene, 4-methyl-1-pentene; modified polypropylenes blended with rubber based polymers; poly(1-butene), poly(4-methyl-1-pentene), modified polypropylenes prepared by reacting the polyolefin with maleic anhydride; and ionomer resins. In the present invention, as polyolefins (A), it is preferable to use polypropylene based resins of polypropylene or propylene based copolymers, or polyethylene based resins of polyethylene or ethylene based copolymers. In particular, it is more preferable to use polypropylene based resins. As a polyolefin (A), one single polyolefin or two or more mixed polyolefins may be used. When, out of these polyolefins (A), polyolefins containing halogen compounds from polymerization catalyst residues or existing as impurities in additives such as fillers and pigments at a level of 1 to 300 ppm, preferably 3 to 150 ppm, in terms of halogens are used, the effect of the present invention will be more remarkable.

EVOH (B) used in the present invention is ethylene-vinyl acetate copolymer with its vinyl acetate units saponified (hydrolyzed). EVOH having a relatively low ethylene content and a high degree of saponification (degree of hydrolysis) of vinyl acetate units tends to show poor compatibility with polyolefin. If the ethylene content in EVOH is excessive, the gas barrier property of the resin composition according to the present invention will be reduced. If the degree of saponification (degree of hydrolysis) of the vinyl acetate units in EVOH is low, the thermal stability of the EVOH itself will be poor. From these standpoints, the ethylene content of EVOH (B) according to the present invention is 20 to 65 mol %, or preferably 20 to 60 mol %, and more preferably 20 to 50 mol %. The degree of saponification of vinyl acetate units of EVOH (B) is preferably 96% or more, or more preferably 98% or more, and even more preferably 99% or more. EVOH having an ethylene content of 20 to 65 mol % and a degree of saponification of 99% or more is especially important as a subject matter to which the present invention applies because it can be used to obtain containers having excellent properties such as gas barrier property when laminated with polyolefin (A).

The EVOH (B) may be modified with other copolymerizable monomers to the extent that does not inhibit the effect of the present invention, usually in the range of not more than 5 mol %. Examples of the modifying copolymerizable monomer include α-olefins such as propylene, 1-butene, 1-hexene, and 4-methyl-1-pentene; esters such as acrylic acid esters and methacrylic acid esters; higher fatty acids such as maleic acid, fumaric acid, and itaconic acid, and vinyl esters thereof; alkyl vinyl ethers; N-(2-dimethylaminoethyl) methacrylamide or its quaternary compounds, N-vinylimidazole or its quaternary compounds, N-vinylpyrrolidone, N,N-butoxymethylacrylamide, vinyltrimethoxysilane, vinylmethyldimethoxysilane, vinyldimethylmethoxysilane, and the like.

It is desirable that the melt index (MI; measured at 190° C., under a load of 2160 g) of EVOH (B) is 0.1 g/10 minutes or more, or preferably 0.5 g/10 minutes or more, and 100 g/10 minutes or less, or more preferably 50 g/10 minutes or less, and most preferably 30 g/10 minutes or less. In this case, from the viewpoint of the dispersibility of EVOH (B), the ratio of MI (B)/MI (A) is preferably in the range of 0.1 to 100, and more preferably 0.3 to 50. Here, MI (B) is MI of EVOH (B) and MI (A) is MI of polyolefin (A) (measured at 190° C., under a load of 2160 g).

To realize the best effect of the present invention, it is important to keep the mass ratio (A:B) of the polyolefin (A) and the EVOH (B) in the resin composition according to the present invention in the range of 60:40 to 99.9:0.1. In the mass ratio, if EVOH (B) exists at a higher level than 60:40, the effect of preventing the aggregation of EVOH (B) at a micro-scale level cannot be fully realized. If polyolefin (A) exists at a higher level than 99.9:0.1, the effect of the present invention cannot be fully observed. From this viewpoint, it is more preferable to keep the mass ratio (A:B) of polyolefin (A) and EVOH (B) in the range of 65:35 to 99.7:0.3.

As for higher fatty acid metal salts (C) according to the present invention, metal salts of lauric acid, stearic acid, myristic acid and the like can be used. As for the metal salts, those of Group I, II, or III of the periodic table, for example, such as sodium salt, potassium salt, calcium salt, and magnesium salt, can be listed. Zinc salt of these fatty acids may also be used. Of these, the metal salts of Group II of the periodic table, such as calcium salt and magnesium salt, are preferable as they can produce the effect of the present invention when added in a small quantity.

If the amount of higher fatty acid metal salts (C) to be added is too small, the effect of the present invention cannot be realized. If an excessive amount of the salts is added, it may promote thermal degradation of EVOH (B) and cause foaming by decomposition gases, or coloration. For this reason, it is preferable that the amount of higher fatty acid metal salts (C) to be added is in the range of 0.0001 to 10 parts by mass per 100 parts by mass of the total of polyolefin (A) and EVOH (B), or more preferable in the range of 0.001 to 1 part by mass.

Conjugated polyene compounds (D) used in the present invent ion are compounds having so-called conjugating double bonds and have a structure in which carbon-carbon double bonds and carbon-carbon single bonds are connected alternately, with the number of carbon-carbon double bonds being 2 or more. A conjugated polyene compound (D) may be a conjugated diene having 2 carbon-carbon double bonds and 1 carbon-carbon single bond connected alternately, or a conjugated triene having 3 carbon-carbon double bonds and 2 carbon-carbon single bonds connected alternately. It may be a conjugated polyene compound having a greater number of carbon-carbon double bonds and carbon-carbon single bonds connected alternately. Polyenes having fewer than 7 carbon-carbon double bonds to conjugate are preferred as, if the number of carbon-carbon double bonds to conjugate is 8 or more, the conjugated polyene compound may color the molded articles by its own color. Also, the polyene may contain, in one molecule, a plurality of independent sets of conjugating double bonds each consisting of 2 or more carbon-carbon double bonds. For example, a compound such as wood oil that has 3 conjugated trienes in one molecule can be included in conjugated polyene compounds (D). Conjugated polyene compounds (D) may also contain, in addition to conjugating double bonds, other functional groups. These functional groups include carboxylic group and its salt, hydroxyl group, ester group, carbonyl group, ether group, amino group, imino group, amide group, cyano group, diazo group, nitro group, sulfonic group, sulfoxide group, sulfide group, thiol group, sulfonic acid group and its salt, phosphate group and its salt, phenyl group, halogen atom, double bond, and triple bond.

Specific examples of conjugated polyene compounds (D) include conjugated diene compounds having conjugation structures of 2 carbon-carbon double bonds such as: isoprene; 2,3-dimethyl-1,3-butadiene; 2,3-diethyl-1,3-butadiene; 2-t-butyl-1,3-butadiene; 1,3-pentadiene; 2,3-dimethyl-1,3-pentadiene; 2,4-dimethyl-1,3-pentadiene; 3,4-dimethyl-1,3-pentadiene; 3-ethyl-1,3-pentadiene; 2-methyl-1,3-pentadiene; 3-methyl-1,3-pentadiene; 4-methyl-1,3-pentadiene; 1,3-hexadiene; 2,4-hexadiene; 2,5-dimethyl-2,4-hexadiene; 1,3-octadiene; 1,3-cyclopentadiene; 1,3-cyclohexadiene; 1-phenyl-1,3-butadiene; 1,4-diphenyl-1,3-butadiene; 1-methoxy-1,3-butadiene; 2-methoxy-1,3-butadiene; 1-ethoxy-1,3-butadiene; 2-ethoxy-1,3-butadiene; 2-nitro-1,3-butadiene; chloroprene; 1-chloro-1,3-butadiene; 1-bromo-1,3-butadiene; 2-bromo-1,3-butadiene; fulvene; tropone; ocimene; phellandrene; myrcene; farnesene; cembrene; sorbic acid; sorbic acid ester; sorbic acid salt; and abietic acid; conjugated triene compounds having conjugation structures of 3 carbon-carbon double bonds such as: 1,3,5-hexatriene; 2,4,6-octatriene-1-carboxylic acid; eleostearic acid; wood oil; and cholecarciferol; and conjugated polyene compounds having conjugation structures of 4 or more carbon-carbon double bonds such as: cyclooctatetraene; 2,4,6,8-decatetraene-1-carboxylic acid; retinol; and retinoic acid. These conjugated polyene compounds (D) may be used singularly or in combinations of 2 or more compounds.

The amount of conjugated polyene compounds (D) to be added is in the range of 0.000001 to 1 part by mass per 100 parts by mass of the total of polyolefin (A) and EVOH (B), or more preferably in the range of 0.00001 to 1 part by mass. If the added amount is less than 0.00001 part by mass per 100 parts by mass of the total of polyolefin (A) and EVOH (B), the effect of the present invention may not be satisfactory. If the added amount is greater than 1 part by mass per 100 parts by mass of the total of polyolefin (A) and EVOH (B), gelation of the obtained resin compositions may be promoted.

Conjugated polyene compound (D) may be directly blended in the mixture of polyolefin (A) and EVOH (B). If the added amount is very small, it may be blended in EVOH (B) with good compatibility in advance so that it can be uniformly dispersed in the resin composition of the present invention.

EVAc (E) used in the present invention may be random copolymers prepared by polymerizing ethylene and vinyl acetate according to known methods, terpolymer prepared by copolymerizing another monomer, or modified EVAc modified by grafting. The vinyl acetate unit content of EVAc (E) is preferably 2 to 40 mol %, or more preferably 5 to 25 mol %. If the vinyl acetate unit content is below 2 mol % or above 40 mol %, EVOH (B) aggregation may not be effectively prevented. The melt index (MI; measured at 190° C., under a load of 2160 g) of EVAc (E) is preferably in the range of 0.1 to 50 g/10 minutes, or more preferably 0.5 to 30 g/10 minutes, and even more preferably 1 to 20 g/10 minutes.

S-EVOH (F) used in the present invention is a saponified ethylene-vinyl acetate copolymer having an ethylene content of 68 to 98 mol % and having a degree of saponification of vinyl acetate units of 20% or more. Unlike the usual type of EVOH used for food wrapping materials, it has high ethylene content and is capable of significantly improving compatibility between polyolefin (A) and EVOH (B). The ethylene content of S-EVOH (F) is preferably 70 mol % or more, and it is preferably 96 mol % or less, or more preferably 94 mol % or less. The degree of saponification of vinyl acetate units is preferably 30% or more, or more preferably 40% or more. The upper limit of the degree of saponification is not strictly defined. Materials with a degree of saponification of 99 mol % or more or substantially 100% can also be used. If the ethylene content is below 68 mol % or above 98 mol %, or if the degree of saponification of vinyl acetate units is less than 20%, the effect of the present invention will not be fully realized.

According to the specification of the present invention, the ethylene content of S-EVOH (F) should be higher than that of EVOH (B). The difference in the ethylene content between S-EVOH (F) and EVOH (B) is preferably at least 10 mol % or more, and more preferably 20 mol % or more from the standpoint of improving the compatibility between polyolefin (A) and EVOH (B).

MI of S-EVOH (F) (measured at 190° C., under a load of 2160 g) is preferably 0.1 g/10 minutes or more, more preferably 0.5 g/10 minutes or more, and even more preferably 1 g/10 minutes or more. At the same time, the MI of S-EVOH (F) is preferably 100 g/10 minutes or less, or more preferably 50 g/10 minutes or less, and even more preferably 30 g/10 minutes or less. S-EVOH (F) used in the present invention may be modified with an unsaturated carboxylic acid or its derivatives. These unsaturated carboxylic acids or derivatives include acrylic acid, methacrylic acid, maleic acid, fumaric acid, itaconic acid, and maleic acid; methyl or ethyl esters of these acids; and maleic anhydride, itaconic anhydride, and the like. These acid monomers may be used singularly or in combination.

The total amount of EVAc (E) and S-EVOH (F) added to the resin composition of the present invention is 0.3 part by mass or more per 100 parts by mass of the total of polyolefin (A) and EVOH (B), and is preferably 0.5 part by mass or more. If the addition is less than 0.3 part by mass, the effect of EVAc (E) and S-EVOH (F) addition will not be fully realized. Although the upper limit of the addition is not clearly specified, excessive addition will not increase the dispersibility of EVOH (B) in the resin composition above a certain limit. In a normal practice, addition of 30 parts by mass or less will be sufficient.

In the resin composition of the present invention, the content of EVAc (E) and S-EVOH (F) in terms of mass ratio (E:F) is preferably in the range of 99.9:0.1 to 70.0:30.0, and more preferably in the range of 99.5:0.5 to 85.0:15.0. In this ratio, if the ratio of S-EVOH (F) is below those ranges, the dispersibility of EVOH (B) in the resin composition may deteriorate and reduce the effects of the present invention. If the proportion of S-EVOH (F) is above those ranges, the effect of improving the dispersibility of EVOH (B) will be lowered.

In addition to above-mentioned polyolefin (A), EVOH (B), higher fatty acid metal salts (C), conjugated polyene compounds (D), EVAc (E) and S-EVOH (F) that constitute the resin composition of the present invention, hydrotalcite (G) may be added. Addition of hydrotalcite (G) as a constituent of the resin composition of the present invention is preferred because it improves the dispersibility of EVOH (B) in the resin compositions.

As hydrotalcite compounds (G) employed in the present invention, hydrotalcite complex salts shown by the following formula can be listed.

$$M_xAl_y(OH)_{2x+3y-2z}(A)_z \cdot aH_2O$$

(where: M is one or more selected from Mg, Ca, Sr, Ba, Zn, Cd, Pb, Sn; A is $CO_3$ or $HPO_4$; x, y, z are positive numbers; a is either 0 or a positive number: 2x+3y−2z>0).

In the hydrotalcites, M is preferably Mg, Ca or Zn, and more preferably is a combination of two or more of these metals. Examples of particularly favorable hydrotalcites are listed below.

$Mg_6Al_2(OH)_{16}CO_3 \cdot 4H_2O$
$Mg_8Al_2(OH)_{20}CO_3 \cdot 5H_2O$
$Mg_5Al_2(OH)_{14}CO_3 \cdot 4H_2O$
$Mg_{10}Al_2(OH)_{22}(CO_3)_2 \cdot 4H_2O$
$Mg_6Al_2(OH)_{16}HPO_4 \cdot 4H_2O$
$Ca_6Al_2(OH)_{16}CO_3 \cdot 4H_2O$
$Zn_8Al_2(OH)_{16}CO_3 \cdot 4H_2O$
$Mg_3ZnAl_2(OH)_{12}CO_3 \cdot 2.7H_2O$
$Mg_6ZnAl_2(OH)_{20}CO_3 \cdot 1.6H_2O$
$Mg_5Zn_{1.7}Al_{3.3}(OH)_{20}(CO_3)_{1.65} \cdot 4.5H_2O$ When hydrotalcite (G) is further added, the added amount is in the range of 0.0001 to 10 parts by mass per 100 parts by mass of the total of polyolefin (A) and EVOH (B), and more preferably in the range of 0.001 to 1 part by mass. If the added amount is less than 0.0001 part by mass per 100 parts by mass of the total of polyolefin (A) and EVOH (B), the effect of the present invention may not be satisfactory. If the added amount is more than 10 parts by mass per 100 parts by mass of the total of polyolefin (A) and EVOH (B), it may promote thermal degradation of EVOH in the obtained resin composition and cause foaming by decomposition gases, or coloration.

Adding modified polyolefin resins modified with unsaturated carboxylic acids or derivatives thereof to the resin composition of the present invention is effective in suppressing the aggregation of EVOH (B) at a micro-scale level. Here, modified polyolefin resins are polyolefin resins modified with one or more of unsaturated carboxylic acids or derivatives thereof, selected from the following groups: unsaturated carboxylic acids such as acrylic acid, methacrylic acid, maleic acid, fumaric acid, crotonic acid, itaconic acid and citraconic acid, including their esters or anhydrides; and derivatives of unsaturated carboxylic acids such as methyl acrylate, methyl methacrylate, ethyl acrylate, propyl acrylate, butyl acrylate, butyl methacrylate, vinyl acetate, glycidyl acrylate, glycidyl methacrylate, acrylamide, methacrylamide, sodium acrylate, and sodium methacrylate. As polyolefin resins before modification, polyethylene, polypropylene, ethylene-vinyl acetate copolymer, and ethylene-acrylate ester copolymers can be preferably listed.

Further, publicly known additives capable of improving various properties such as thermal stability at the time of melt extrusion molding of EVOH may be preferably added within the reasonable extent that does not inhibit the effect of the present invention as these additives may be expected to reduce the deterioration of EVOH (B) which is a constituent of the resin composition of the present invention. These additives include organic acids such as acetic acid and lactic acid, inorganic acids such as hydrochloric acid and phosphoric acid, metal salts of these acids with metals of periodic table Groups I, II and III, boron compounds such as boric acid, and higher fatty acids such as stearic acid. In particular, addition of boric acid is effective to suppress aggregation of EVOH (B), with the preferable amount to be added ranging from 0.0001 to 0.1 part by mass per 100 parts by mass of the total of polyolefin (A) and EVOH (B). Conversely, boric acid added in excess of 0.1 part by mass per 100 parts by mass of the total of polyolefin (A) and EVOH (B) may promote the aggregation of EVOH (B).

In the following, the method of obtaining the resin composition of the present invention by mixing the polyolefin (A), EVOH (B), higher fatty acid metal salts (C), conjugated polyene compounds (D), EVAc (E), and S-EVOH (F), and the method of molding the resin compositions, will be explained.

There are no particular restrictions with respect to methods for blending to obtain the resin composition according to the present invention. A method wherein polyolefin (A), EVOH (B), higher fatty acid metal salts (C), conjugated polyene compounds (D), EVAc (E) and S-EVOH (F) are dry-blended together and then melt-blended; and a method wherein higher fatty acid metal salts (C) and/or conjugated polyene compounds (D) are blended in advance in polyolefin (A) and/or EVOH (B), and the mixture is dry-blended with the remaining components and then melt-blended; can be listed as examples. A preferable method is the one wherein a mixture prepared by blending polyolefin (A) and conjugated polyene compounds (D) in EVOH (B) is dry-blended with a mixture prepared by blending higher fatty acid metal salts (C), EVAc (E), and S-EVOH (F), and the final mixture is melt-blended. Another preferable method is the one wherein a mixture prepared by blending polyolefin (A) and conjugated polyene compounds (D) with EVOH (B) is dry-blended with another mixture prepared by blending higher fatty acid metal salts (C), EVAc (E), and S-EVOH (F) with polyolefin (A), and then melt-blended.

As described above, when a conjugated polyene compound (D) is blended in EVOH (B) in advance, satisfactory results can be obtained as to the effect of the present invention even when a reduced amount of conjugated polyene compound (D) is added. Methods of blending conjugated polyene compound (D) in EVOH (B) in advance are not specified. A method is listed as an example wherein EVOH (B) is dissolved in a good solvent of EVOH (B) such as water/methanol mixed solvent, and a conjugated polyene compound (D) is dissolved in this solution at a concentration level of 0.000001 to 10 parts by mass per 100 parts by mass of EVOH (B). The mixed solution is extruded into a poor solvent through a nozzle, etc. The deposit is precipitated, solidified, rinsed and dried to obtain EVOH (B) blended with a conjugated polyene compound (D).

Methods for blending a higher fatty acid metal salt (C), EVAc (E) and S-EVOH (F) in advance, and those for blending a higher fatty acid metal salt (C), EVAc (E), and S-EVOH (F) in a polyolefin (A) in advance are not specified. A method in which each component is dry-blended, or a method in which each component is melt-blended and then pelletized so as to prepare a master batch, are listed as examples. Of these methods, the latter is more favorable to easy handling from the standpoint that higher fatty acid metal salts (C) are usually in a powder form.

When a sample of the master batch is analyzed by the nuclear magnetic resonance spectroscopy ($^1$H-NMR) method, the signal strength ratio (Ja:Jb) is preferably in the range of 99.5:0.5 to 70.0:30.0. Here, Ja is the signal deriving from the hydrogen atoms bonded to the carbon atoms to which acetoxy groups are bonded, and Jb is the signal deriving from the hydrogen atoms bonded to the carbon atoms to which hydroxyl groups are bonded. In other words, it is preferable, from the standpoint of improving the dispersibility of EVOH (B), that carbon atoms bonded with acetoxy groups and carbon atoms bonded with hydroxyl groups exist in the resin composition of the present invention, and its existing molar ratio is in the range of 99.5:0.5 to 70.0:30.0. If the strength ratio is either below 0.5 or above 30.0, the effect of improving the dispersibility of EVOH (B) may not be satisfactory.

As methods for keeping the strength ratio of Ja and Jb, i.e., (Ja:Jb), in the range of 99.5:0.5 to 70.0:30.0, a method of adjusting the mixing ratio of EVAc (E) and S-EVOH (F) suitably, a method of adjusting the degree of saponification of S-EVOH (F), and a method of adjusting the ethylene content of EVAc (E) and/or S-EVOH (F) suitably, can be listed.

There are no particular restrictions with respect to methods for blending when adding hydrotalcite (G). A mixture of polyolefin (A), EVOH (B), higher fatty acid metal salts (C), conjugated polyene compounds (D), EVAc (E), and S-EVOH (F) can be dry-blended with hydrotalcite (G) and then melt-blended. If polyolefin (A), higher fatty acid metal salts (C), EVAc (E), and S-EVOH (F) are melt-blended and then pelletized in advance to obtain a master batch, hydrotalcite (G) can be blended at the same time to be included in the pellet when the master batch is manufactured. This treatment is preferable from the standpoint of reducing the number of materials to be handled at the final step of melt-blending the resin composition of the present invention.

The resin composition of the present invention may further blend additives other than those described above to the extent that does not inhibit the effect of the present invention. These additives include antioxidants, ultraviolet absorbers, plasticizers, antistatic agents, lubricants, coloring agents, fillers and other polymeric compounds. Specific examples of additives are shown below.

Antioxidants: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxylphenyl) propionate, 4,4'-thiobis-(6-t-butylphenol), and the like.

Ultraviolet absorbers: ethylene-2-cyano-3,3'-diphenyl acrylate, 2-(2'-hydroxyl-5'-methylphenyl)benzotriazole, 2-(2'-hydroxyl-3'-t-butyl-5'-methylphenyl)-5-chlorobenzotriazole, 2-hydroxyl-4-methoxybenzophenone, 2,2'-dihydroxyl-4-methoxybenzophenone, 2-hydroxyl-4-octoxybenzophenone, and the like.

Plasticizers: dimethyl phthalate, diethyl phthalate, dioctyl phthalate, wax, liquid paraffin, phosphoric acid esters, and the like.

Antistatic agents: pentaerythrit monostearate, sorbitan monopalmitate, sulfated polyolefins, polyethylene oxide, carbowax, and the like.

Lubricants: ethylenebisstearoamide, butyl stearate, and the like.

Coloring agents: titanium oxide, carbon black, phthalocyanine, quinacrydone, indolin, azo pigments, colcothar, and the like.

Fillers: glass fiber, asbestos, balastonite, calcium silicate, and the like.

Among these additives, coloring agents and fillers in particular, may often contain impurities that promote aggregation of EVOH (B) that constitutes the resin composition of the present invention at a micro-scale level. For this reason, when these additives are blended in, the amount of higher fatty acid metal salts (C) and/or conjugated polyene compounds (D), and/or EVAc (E) and/or S-EVOH (F) to be blended may have to be increased as needed.

Many other polymeric compounds may also be blended in the resin composition of the present invention to the extent that does not inhibit the effect of the present invention.

As the mixing tools for each constituent to obtain the resin composition of the present invention, ribbon blenders, high-speed mixer-cokneaders, mixing rolls, extruders, intensive mixers, or the like, can be listed.

The resin composition of the present invention can be molded into desired molded articles such as films, sheets, tubes, bottles, cups, and the like through publicly known melt extrusion molding machines, compression molding machines, transfer molding machines, injection molding machines, blow molding machines, heat molding machines, rotary molding machines, dipping molding machines, and the like. The extrusion temperature for molding is generally in the range of 170 to 350° C., although it is suitably selected depending on the type of polyolefin (A) constituting the resin composition of the present invention, melt indices of polyolefin (A) and EVOH (B), composition ratio of polyolefin (A) and EVOH (B), or type of molding machine and the like.

When the resin composition of the present invention is used as a layer construction of a multilayer structure containing the layer of polyolefin and the layer of EVOH, the multilayer structure may has any layer construction with one or more layers positioned in arbitrary positions. Such layer constructions are expressed as in the following layer constructions, where c is the resin composition of the present invention, a is polyolefin, b is EVOH, and ad is adhesive resin. Here, the modified polyolefin resin, modified with unsaturated carboxylic acids or derivatives thereof can be preferably used as ad.

3 layers: a/c/b
4 layers: c/b/ad/a, a/c/ad/b
5 layers: c/ad/b/ad/c, a/c/b/ad/a, a/c/b/c/a
6 layers: a/c/ad/b/ad/a
7 layers: a/c/ad/b/ad/c/a In these multilayer structures, the resin composition of the present invention can be replaced with melt-blended scraps of the multilayer structure. In addition to the multilayer structure, scraps of other polyolefin molding can be mixed and melt-blended. Therefore, in the case when an ad layer is used in such multilayer structures, the resin composition of the present invention will necessarily contain ad as a constituent.

As the multilayer structures of the layer construction contain EVOH having a high gas barrier property, these are useful as packaging materials for food products, medicinal products, and medical devices, and the like, which require high gas barrier properties.

As a method of multilayer formation, co-extrusion molding is a favorable method. In this method, a number of separate extruders corresponding to the number of types of resin layers are used, and resins melted in each extruder are simultaneously co-extruded to form a laminated layer structure. Other applicable methods are multilayer formation methods including extrusion coating and dry lamination, and the like. Further, molded articles having excellent mechanical properties and excellent gas barrier properties can be obtained by performing the stretching on the singular molded article of the resin composition of the present invention, or the multilayer structures containing the resin composition of the present invention by means of monoaxial stretching, biaxial stretching, or blow stretching.

Molded articles obtained from the resin composition of the present invention have neat appearances and have excellent mechanical properties and excellent gas barrier properties, as EVOH in the resin composition of the present invention is uniformly dispersed with its aggregation at a micro-scale level suppressed. Thus, these articles are of great industrial value.

EXAMPLES

In the following, the present invention will be explained in greater detail through examples. In the following manufacturing examples, examples, and comparative examples, "part" means "part by mass" unless otherwise specified.
[Method of Quantitative Determination of Conjugated Polyene Compound (D) Blended in EVOH]

The amount of conjugated polyene compound (D) in EVOH was quantitatively determined in the following manner. In this method, EVOH containing conjugated polyene compound (D) was pulverized and sifted through a 100-mesh sieve to eliminate coarse particles. A 10 g portion of this powder was submitted to Soxhlet extraction for 48 hours with 100 ml of chloroform. The amount of conjugated polyene compound in the extraction liquid was determined by high performance liquid chromatography using calibration curves prepared with the reference standard of each conjugated polyene compound.
[NMR Analysis]

Various master batches containing EVAc (E) and S-EVOH (F), prepared according to the manufacturing examples described below, were individually dissolved in a mixed solvent of o-dichlorobenzene/o-dichlorobenzene-$d_4$=80/20 (volume ratio) at a concentration of 5 mass %. Measurement was performed with $^1$H-NMR (500 MHz, measurement temperature=120° C., accumulation number=1024 times, TMS, δ (ppm)). The signal strength ratio between Ja and Jb was calculated by measuring the area ratios of signal Jb at around 3.58 ppm (deriving from hydrogen atoms bonded to the carbon atom to which hydroxyl group is bonded), and signal Ja at around 5.05 ppm (deriving from hydrogen atoms bonded to the carbon atom to which acetoxy group is bonded).

Manufacturing Example 1

(1) 2000 parts of EVOH having an ethylene content of 32 mol %, having a degree of saponification of 99.8 mol %, and limiting viscosity $[\eta]_{ph}$ of 0.092 l/g as measured at 30° C. using a liquid mixture of water/phenol=15/85 (mass ratio) as a solvent, were added to 18000 parts of a mixed solvent of water/methanol=40/60 (mass ratio) and completely dissolved by stirring for 6 hours at 60° C. To this solution, 2 parts of sorbic acid were added as a conjugated polyene compound (D) and completely dissolved by stirring for 1 additional hour at 60° C. to obtain EVOH solution containing sorbic acid. This EVOH solution was continuously extruded into a coagulation bath of water/methanol=5/95 (mass ratio) at 0° C. through a nozzle of 4 mm in diameter to coagulate EVOH in a stranded shape. This strand was then introduced into a pelletizer to obtain porous EVOH chips.

(2) The porous EVOH chips obtained in (1) above were consecutively rinsed with 2000 parts of 0.1 mass % aqueous acetic acid solution and then with 2000 parts of ion exchanged water at 20° C. followed by immersion for 4 hours in 2000 parts of 0.092% aqueous boric acid solution at 20° C. per 100 parts of the chips. EVOH chips were dewatered and isolated from the solution and dried for 4 hours in a hot-air drier at 80° C., followed by drying for 16 hours at 100° C. to obtain EVOH chips. The obtained EVOH chips contained 0.11 part of boric acid and 0.01 part of sorbic acid per 100 parts of EVOH.

The melt index of this EVOH was 1.6 g/10 minutes (ASTM-D1238, measured at 190° C., under a load of 2160 g). This EVOH chip is called EVOH (B1).

Manufacturing Example 2

EVOH (B2) containing 0.05 part of p-myrcene per 100 parts of EVOH was obtained in the same manner as in Manufacturing Example 1 except for the use of 2 parts of p-myrcene instead of the 2 parts of sorbic acid in Manufacturing Example 1 (1) as the conjugated polyene compound (D).

Manufacturing Example 3

EVOH (B3) was obtained in the same manner as in Manufacturing Example 1 except that sorbic acid was not added to EVOH water/methanol solution in Manufacturing Example 1(1).

Manufacturing Example 4

EVOH (B4) containing 0.002 part of sorbic acid per 100 parts of EVOH was obtained in the same manner as in Manufacturing Example 1 except for changing the amount of sorbic acid added to EVOH water/methanol solution from 2 parts to 0.4 part in Manufacturing Example 1(1).

Manufacturing Example 5

EVOH (B5) containing 0.0032 part of sorbic acid per 100 parts of EVOH was obtained in the same manner as in Manufacturing Example 1 except for changing the amount of sorbic acid added to EVOH water/methanol solution from 2 parts to 0.65 part in Manufacturing Example 1(1).

Manufacturing Example 6

(1) Porous EVOH chips were obtained in the same manner as in Manufacturing Example 1 except that EVOH having an ethylene content of 32 mol % and a degree of saponification of 99.8 mol %, and an limiting viscosity $[\eta]_{ph}$ of 0.112 l/gas measured at 30° C. using a liquid mixture of water/phenol=15/85 (mass ratio) as a solvent.

(2) The porous EVOH chips obtained in (1) above were consecutively rinsed with 0.1 mass % aqueous acetic solution and ion exchanged water in the same manner as in Manufacturing Example 1(2), and then were dried in the same manner as in Manufacturing Example 1(2) without immersing in aqueous boric acid solution. In this way, EVOH (B6) was obtained. The melt index of this EVOH (ASTM-D1238, measured at 190° C., under a load of 2160 g) was 1.5 g/10 minutes.

Manufacturing Example 7

40 parts of low density polyethylene {LDPE, melt index 1.5 g/10 minutes (ASTM-D1238, measured at 190° C.), hereinafter simply, "LDPE"}, 2 parts of calcium stearate which is a higher fatty acid metal salt (C), 57.74 parts of EVAc (hereinafter simply, "EVAc (E1)") with vinyl acetate units of 7.0 mol % and melt index of 2.7 g/10 minutes (ASTM-D1238, measured at 190° C., under a load of 2160 g), and 2.26 parts of a saponified ethylene-vinyl acetate copolymer (hereinafter, "S-EVOH (F1)") having an ethylene content of 89 mol %, a degree of saponification of vinyl acetate units of 97 mol % and melt index of 5.1 g/10 minutes (ASTM-D1238, measured at 190° C., under a load of 2160 g), were dry-blended. The resulting mixture was pelletized after melt-blending in a twin screw co-rotating extruder having a diameter of 30 mm (TEX-30N (trade name), manufactured by Japan Steel Works, Ltd.) at an extrusion temperature of 200° C. to obtain a master batch (MB1). According to the NMR analysis of this master batch (MB1), the signal strength ratio (Ja:Jb) between the signal Ja deriving from hydrogen atoms bonded to the carbon atom to which acetoxy group is bonded, and the signal Jb deriving from hydrogen atoms bonded to the carbon atom to which hydroxyl group is bonded, was 94.0:6.0.

Manufacturing Example 8

In Manufacturing Example 7, 2 parts of $Mg_6Al_2(OH)_{16}CO_3.4H_2O$ which is a hydrotalcite (G) were further added by dry-blending. The resulting mixture was pelletized in the same manner as in Manufacturing Example 7. Thus, a master batch (MB2) was obtained.

Manufacturing Example 9

The pelletizing was repeated in the same manner as in Manufacturing Example 7 except that EVAc (E1) and S-EVOH (F1) were not added in Manufacturing Example 7. Thus, the master batch (MB3) was obtained.

Manufacturing Example 10

The pelletizing was repeated in the same manner as in Manufacturing Example 7 except that calcium stearate was not added in Manufacturing Example 7. Thus, the master batch (MB4) was obtained.

Manufacturing Example 11

The pelletizing was repeated in the same manner as in Manufacturing Example 7 except that 60 parts of EVAc (E1) were used, instead of 57.74 parts of EVAc (E1) and 2.26 parts of S-EVOH (F1) in Manufacturing Example 7. Thus, the master batch (MB5) was obtained.

Manufacturing Example 12

The pelletizing was repeated in the same manner as in Manufacturing Example 7 except that 2 parts of magnesium stearate were used as the higher fatty acid metal salt (C) instead of 2 parts of calcium stearate in Manufacturing Example 7. Thus, the master batch (MB6) was obtained.

Manufacturing Example 13

The pelletizing was repeated in the same manner as in Manufacturing Example 7 except that the added amount of EVAc (E1) was changed from 57.74 parts to 13.47 parts, and that of S-EVOH (F1) was changed from 2.26 parts to 0.53 part in Manufacturing Example 7. Thus, the master batch (MB7) was obtained. According to the NMR analysis of this master batch (MB7), the signal strength ratio (Ja:Jb) between the signal Ja deriving from hydrogen atoms bonded to the carbon atom to which acetoxy group is bonded, and the signal Jb deriving from hydrogen atoms bonded to the carbon atom to which hydroxyl group is bonded, was 94.0:6.0.

Manufacturing Example 14

The pelletizing was repeated in the same manner as in Manufacturing Example 7 on the mixture obtained by dry-blending 2 parts of calcium stearate which is a higher fatty acid metal salt (C), 57.74 parts of EVAc (E1) and 2.26 parts of S-EVOH (F1) in Manufacturing Example 7. Thus, the master batch (MB8) was obtained. According to the NMR analysis of this master batch (MB8), the signal strength ratio (Ja:Jb) between the signal Ja deriving from hydrogen atoms bonded to the carbon atom to which acetoxy group is bonded, and the signal Jb deriving from hydrogen atoms bonded to the carbon atom to which hydroxyl group is bonded, was 94.0:6.0.

Manufacturing Example 15

The pelletizing was repeated in the same manner as in Manufacturing Example 7 except that 60 parts of S-EVOH (F1) were used instead of 57.74 parts of EVAc (E1) and 2.26 parts of S-EVOH (F1) in Manufacturing Example 7. Thus, the master batch (MB9) was obtained.

Example 1

As polyolefin (A), polypropylene {melt index 5.4 g/10 minutes (ASTM-D1238, measured at 230° C.), hereinafter "PP"} was used. 88 parts of the PP, 10 parts of EVOH (B1), and 5.1 parts of the master batch (MB1) were dry-blended to obtain a mixture. The composition of this mixture was 88 parts of PP which is a polyolefin (A), 2 parts of LDPE, 10 parts of EVOH (B), 0.1 part of calcium stearate which is a higher fatty acid metal salt (C), 0.001 part of sorbic acid which is a conjugated polyene compound (D), 2.88 parts of EVAc (E1), and 0.12 part of S-EVOH (F1). Using a single screw extruder having a diameter of 20 mm (Laboplast-mill—manufactured by Toyo Seiki, Co.) and a 300 mm wide T-die extruder, a single layer film, 40 μm thick, was manufactured from this mixture. The film manufacturing temperature was 190 to 230° C. at the extruder, and 220° C. at the die. The screw rotation was 40 rpm, and the volume of discharge was 0.95 kg/hour. About 50 m of the film was sampled 1 hour after the mixture was put in the extruder hopper. On the center part of the sampled film, a square, 10 cm by 10 cm, was drawn and the number of EVOH aggregates, approximately 200 μm or more in diameter (the maximum diameter), in this square was counted using the backlight of a table-top fluorescent lamp. This counting was done at an interval of 20 cm, with a total of 100 positions along the length of the sampled film. The average of EVOH aggregate count per 100 cm$^2$ was calculated to be 0.10 piece.

Example 2

The dry-blended mixture was obtained in the same manner as in Example 1 except that 10 parts of EVOH (B2) containing j-myrcene were used instead of 10 parts of EVOH (B1) containing sorbic acid in Example 1. A single layer film was manufactured from this mixture and then the EVOH aggregates in the obtained film were counted in the same manner as in Example 1. The result was 0.12 piece per 100 cm$^2$.

Example 3

The dry-blended mixture was obtained in the same manner as in Example 1 except that 5.2 parts of the master batch (MB2) containing a hydrotalcite (G) were dry-blended instead of 5.1 parts of the masterbatch (MB1) in Example 1. A single layer film was manufactured from this mixture and then the EVOH aggregates in the obtained film were counted in the same manner as in Example 1. The result was 0.04 piece per 100 cm$^2$.

Comparative Example 1

In the process of Example 1, 90 parts of PP, and 10 parts of EVOH (B3) not containing conjugated polyene compounds (D) were dry-blended. A single layer film was manufactured from this mixture and then the EVOH aggregates in the obtained film were counted in the same manner as in Example 1. The result was 100 pieces or more per 100 cm$^2$.

Comparative Example 2

A single layer film was manufactured in the same manner as in Example 1 except that 5.0 parts of the master batch (MB4) not containing calcium stearate which is a higher fatty acid metal salt (C) were used, instead of 5.1 parts of the master batch (MB1) in Example 1. A single layer film was manufactured from this mixture and then the EVOH aggregates in the obtained film were counted in the same manner as in Example 1. The result was 7.51 pieces per 100 cm$^2$.

Comparative Example 3

A single layer film was manufactured in the same manner as in Example 1 except that 2.1 parts of the master batch (MB3) not containing EVAc (E1) or S-EVOH (F1) were used instead of 5.1 parts of the master batch (MB1) in Example 1. A single layer film was manufactured from this mixture and then the EVOH aggregates in the obtained film were counted in the same manner as in Example 1. The result was 6.12 pieces per 100 cm$^2$.

Comparative Example 4

A single layer film was manufactured in the same manner as in Example 1 except that 5.1 parts of the master batch (MB5) not containing S-EVOH (F1) were used instead of 5.1 parts of the master batch (MB1) in Example 1. A single layer film was manufactured from this mixture and then the EVOH aggregates in the obtained film were counted in the same manner as in Example 1. The result was 4.33 pieces per 100 cm$^2$.

Example 4

A single layer film was manufactured in the same manner as in Example 1 except that 68 parts of PP; 30 parts of EVOH (B5); and 5.1 parts of the master batch (MB1) containing calcium stearate which is a higher fatty acid metal salt (C), EVAc (E1), and S-EVOH (F1); were dry-blended in Example 1. A single layer film was manufactured from this mixture and then the EVOH aggregates in the obtained film were counted in the same manner as in Example 1. The result was 0.27 piece per 100 cm$^2$.

Example 5

A single layer film was manufactured in the same manner as in Example 1 except that 10 parts of EVOH (B6) not containing boric acid were used, instead of 10 parts of EVOH (B1) in Example 1. A single layer film was manufactured from this mixture and then the EVOH aggregates in the obtained film were counted in the same manner as in Example 1. The result was 0.45 piece per 100 cm$^2$.

Example 6

A single layer film was manufactured in the same manner as in Example 1 except that 5.1 parts of the master batch (MB6) containing magnesium stearate were used, instead of 5.1 parts of the master batch (MB1) which contain calcium stearate in Example 1. A single layer film was manufactured from this mixture and then the EVOH aggregates in the obtained film were counted in the same manner as in Example 1. The result was 0.13 piece per 100 cm$^2$.

Comparative Example 5

A single layer film was manufactured in the same manner as in Example 1 except that 10 parts of EVOH (B3) not containing conjugated polyene compounds (D) were used, instead of 10 parts of EVOH (B1) in Example 1. A single layer film was manufactured from this mixture and then the EVOH aggregates in the obtained film were counted in the same manner as in Example 1. The result was 0.80 piece per 100 cm$^2$.

Comparative Example 6

A single layer film was manufactured in the same manner as in Example 1 except that 48 parts of PP, 50 parts of EVOH (B4), and 5.1 parts of the master batch (MB1) were dry-blended in Example 1. A single layer film was manufactured from this mixture and then the EVOH aggregates in the obtained film were counted in the same manner as in Example 1. The result was 3.54 pieces per 100 cm$^2$.

Comparative Example 7

88 parts of PP, 10 parts of EVOH (B1) containing conjugated polyene compounds (D), and 5.1 parts of the master batch (MB1) were dry-blended, and then further dry-blended with 19.9 parts of calcium stearate. It was attempted to manufacture a single layer film by using this mixture in the same manner as in Example 1. However, calcium stearate in liquid form, which had separated from the resins, seeped out of a T-die lip part and many holes were formed on the film surface, and therefore counting of EVOH aggregates was not possible.

Example 7

A single layer film was manufactured in the same manner as in Example 1 except that 2.8 parts of the master batch (MB7) were used, instead of 5.1 parts of the master batch (MB1) in Example 1. A single layer film was manufactured from this mixture and then the EVOH aggregates in the obtained film were counted in the same manner as in Example 1. The result was 0.31 piece per 100 cm$^2$.

Example 8

The process of Example 1 was repeated to prepare a dry blend except that EVOH (B3) not containing conjugated polyene compound (D) was used instead of 10 parts of EVOH (B1) in Example 1. To the mixture thus obtained, sorbic acid which is a conjugated polyene compound (D)

was dry-blended by 0.001 part relative to 10 parts of EVOH (B3). By using the obtained mixture, a single layer film was manufactured in the same manner as in Example 1. The results showed the EVOH aggregate count of 0.25 piece per 100 cm$^2$.

Example 9

A single layer film was manufactured in the same manner as in Example 1 except that 88 parts of high density polyethylene {melt index 0.9 g/10 minutes (ASTM-D1238, measured at 190° C.) hereinafter, "HDPE" } were used instead of 88 parts of PP as polyolefin (A) in Example 1. A single layer film was manufactured from this mixture and then the EVOH aggregates in the obtained film were counted in the same manner as in Example 1. The result was 0.18 piece per 100 cm$^2$.

Comparative Example 8

In the process of Example 1, 88 parts of PP, 10 parts of EVOH (B3) not containing conjugated polyene compound (D) and 5.1 parts of the master batch (MB1) were dry-blended. To the mixture thus obtained, 5 parts of sorbic acid which is a conjugated polyene compound (D) were added and further dry-blended to prepare a uniform blend. By using this mixture, a single layer film was manufactured in the same manner as in Example 1. The results showed the EVOH aggregate count of 100 pieces or more per 100 cm$^2$.

Comparative Example 9

A single layer film was manufactured in the same manner as in Example 9 except that 90 parts of HDPE were used and the master batch (MB1) was not added in Example 9. A single layer film was manufactured from this mixture and then the EVOH aggregates in the obtained film were counted in the same manner as in Example 1. The result was 4.56 pieces per 100 cm$^2$.

Example 10

The dry-blended mixture was obtained in the same manner as in Example 1 except that 90 parts of PP and 3.1 parts of the master batch (MB8) were used, instead of 88 parts of PP and 5.1 parts of the master batch (MB1) in Example 1. A single layer film was manufactured from this mixture and then the EVOH aggregates in the obtained film were counted in the same manner as in Example 1. The result was 0.11 piece per 100 cm$^2$.

Comparative Example 10

A single layer film was manufactured in the same manner as in Example 1 except that 5.1 parts of the master batch (MB9) not containing EVAc (E1) were used, instead of 5.1 parts of the master batch (MB1) in Example 1. A single layer film was manufactured from this mixture and then the EVOH aggregates in the obtained film were counted in the same manner as in Example 1. The result was 0.87 piece per 100 cm$^2$.

Example 11

Manufacturing testing of co-extrusion film including the resin composition layers of the present invention was performed by using the following four types of 7-layer co-extrusion cast film manufacturing equipment.
Extruder (1): single screw, screw diameter 65 mm, L/D=22, for outer layer polyolefin
Extruder (2): single screw, screw diameter 40 mm, L/D=26, for resin composition of this present invention
Extruder (3): single screw, screw diameter 40 mm, L/D=22, for adhesive resins
Extruder (4): single screw, screw diameter 40 mm, L/D=26, for EVOH Co-extrusion film manufacturing was performed by feeding PP into Extruder (1), a mixture of 88 parts of PP, 10 parts of EVOH (B1), and 5.1 parts of the master batch (MB1) prepared by dry-blending in the same manner as in Example 1, into Extruder (2), a modified polypropylene adhesive resin modified with maleic acid anhydride (ADMER QF-500 (tradename), manufactured by Mitsui Chemical, Inc.) into Extruder (3), and EVOH (B1) into Extruder (4), respectively. The extrusion temperature was 200 to 240° C. for Extruder (1), 160 to 220° C. for Extruder (2), 160 to 230° C. for Extruder (3), 170 to 210° C. for Extruder (4), and 220° C. for feed block and die. The objective for the manufactured multilayer film composition and the thickness was: PP/resin composition of the present invention/adhesive resin/EVOH/adhesive resin/resin composition of the present invention/PP=30/15/2.5/5/2.5/15/30 μm, a total of 100 μm in thickness made of four types and seven layers.

According to the observation of the appearance of the film sampling of the multilayer film after 2 hours following the initiation of the film manufacturing, it was concluded that the obtained multilayer film does not present any problem for practical application, with hardly any deteriorated appearance attributable to EVOH aggregation.

Comparative Example 11

A multi layer film was obtained in the same manner as in Example 11 except that the mixture used for feeding the Extruder (2) in Example 11 was replaced by the mixture used in Comparative Example 1 prepared by dry-blending 90 parts of PP and 10 parts of EVOH (B3). The obtained multilayer film clearly showed a poor appearance due to EVOH aggregates at a level unsuitable for practical application.

Comparative Example 12

A multilayer film was obtained in the same manner as in Example 11 except that the mixture used for feeding the Extruder (2) in Example 11 was replaced by the mixture used in Comparative Example 5 prepared by dry-blending 88 parts of PP, 10 parts of EVOH (B3) not containing conjugated polyene compounds (D); and 5.1 parts of the master batch (MB1) containing calcium stearate which is a higher fatty acid metal salt (C), EVAc (E1), and S-EVOH (F1). Although the appearance of the obtained multilayer film was better than that of the multilayer film of Comparative Example 11, it still showed some poor appearance due to EVOH aggregates at a level unsuitable for practical application.

Comparative Example 13

A multilayer film was obtained in the same manner as in Example 11 except that the mixture used for feeding the Extruder (2) in Example 11 was replaced by the mixture used in Comparative Example 3 prepared by dry-blending 88 parts of PP, 10 parts of EVOH (B1), and 2.1 parts of the master batch (MB3) not containing EVAc (E1) or S-EVOH (F1). Although the appearance of the obtained multilayer film was better than that of the multilayer film of Comparative Example 11, it still showed some poor appearance due to EVOH aggregates at a level unsuitable for practical application.

Comparative Example 14

A multilayer film was obtained in the same manner as in Example 11 except that the mixture used for feeding the Extruder (2) in Example 11 was replaced by the mixture used in Comparative Example 2 prepared by dry-blending 88 parts of PP, 10 parts of EVOH (B1), and 5.0 parts of the master batch (MB4) not containing higher fatty acid metal salts (C). Although the appearance of the obtained multilayer film was better than that of the multilayer film of Comparative Example 11, it still showed some poor appearance due to EVOH aggregates at a level unsuitable for practical application.

Example 12

A multilayer film was obtained in the same manner as in Example 11 except that the mixture used for feeding the Extruder (2) in Example 11 was replaced by the mixture used in Example 3 prepared by dry-blending 88 parts of PP, 10 parts of EVOH (B1), and 5.2 parts of the master batch (MB2) containing a hydrotalcite (G). The appearance of the obtained multilayer film was even better than that of the multilayer film of Example 11, with no poor appearance due to EVOH aggregates.

The results of each Example and Comparative Example are summarized in Table 1 and Table 2.

TABLE 1

| | Polyolefin (A) | | | | EVOH (B) | | Higher fatty acid metal salt (C) | |
|---|---|---|---|---|---|---|---|---|
| | Type | Amount | Type | Amount | Type | Amount | Type | Amount[1] |
| EX. 1 | PP | 88 | LDPE | 2 | EVOH(B1) | 10 | Calcium stearate | 0.1 |
| EX. 2 | PP | 88 | LDPE | 2 | EVOH(B2) | 10 | Calcium stearate | 0.1 |
| EX. 3 | PP | 88 | LDPE | 2 | EVOH(B1) | 10 | Calcium stearate | 0.1 |
| EX. 4 | PP | 68 | LDPE | 2 | EVOH(B5) | 30 | Calcium stearate | 0.1 |
| EX. 5 | PP | 88 | LDPE | 2 | EVOH(B6) | 10 | Calcium stearate | 0.1 |
| EX. 6 | PP | 88 | LDPE | 2 | EVOH(B1) | 10 | Magnesium stearate | 0.1 |
| EX. 7 | PP | 88 | LDPE | 2 | EVOH(B1) | 10 | Calcium stearate | 0.1 |
| EX. 8 | PP | 88 | LDPE | 2 | EVOH(B3) | 10 | Calcium stearate | 0.1 |
| EX. 9 | HDPE | 88 | LDPE | 2 | EVOH(B1) | 10 | Calcium stearate | 0.1 |
| EX. 10 | PP | 90 | | | EVOH(B1) | 10 | Calcium stearate | 0.1 |
| Comparative EX. 1 | PP | 90 | | | EVOH(B3) | 10 | — | — |
| Comparative EX. 2 | PP | 88 | LDPE | 2 | EVOH(B1) | 10 | — | — |
| Comparative EX. 3 | PP | 88 | LDPE | 2 | EVOH(B1) | 10 | Calcium stearate | 0.1 |
| Comparative EX. 4 | PP | 88 | LDPE | 2 | EVOH(B1) | 10 | Calcium stearate | 0.1 |
| Comparative EX. 5 | PP | 88 | LDPE | 2 | EVOH(B3) | 10 | Calcium stearate | 0.1 |
| Comparative EX. 6 | PP | 48 | LDPE | 2 | EVOH(B4) | 50 | Calcium stearate | 0.1 |
| Comparative EX. 7 | PP | 88 | LDPE | 2 | EVOH(B1) | 10 | Calcium stearate | 20 |
| Comparative EX. 8 | PP | 88 | LDPE | 2 | EVOH(B3) | 10 | Calcium stearate | 0.1 |
| Comparative EX. 9 | HDPE | 90 | | | EVOH(B1) | 10 | — | — |
| Comparative EX. 10 | PP | 88 | LDPE | 2 | EVOH(B1) | 10 | Calcium stearate | 0.1 |

| | Conjugated polyene compound (D) | | EVAc (E) | S-EVOH (F) | Hydrotalcite (G) | NMR strength ratio | EVOH aggregate count |
|---|---|---|---|---|---|---|---|
| | Type | Amount[1] | Amount[1] | Amount[1] | Amount[1] | Ja:Jb | (per 100 cm$^2$) |
| EX. 1 | sorbic acid | 0.001 | 2.88 | 0.12 | | 94.0:6.0 | 0.10 |
| EX. 2 | β-myrcene | 0.005 | 2.88 | 0.12 | | 94.0:6.0 | 0.12 |
| EX. 3 | sorbic acid | 0.001 | 2.88 | 0.12 | 0.1[2] | 94.0:6.0 | 0.04 |
| EX. 4 | sorbic acid | 0.00096 | 2.88 | 0.12 | | 94.0:6.0 | 0.27 |
| EX. 5 | sorbic acid | 0.001 | 2.88 | 0.12 | | 94.0:6.0 | 0.45 |
| EX. 6 | sorbic acid | 0.001 | 2.88 | 0.12 | | 94.0:6.0 | 0.13 |
| EX. 7 | sorbic acid | 0.001 | 0.672 | 0.028 | | 94.0:6.0 | 0.31 |
| EX. 8 | sorbic acid | 0.001 | 2.88 | 0.12 | | 94.0:6.0 | 0.25 |
| EX. 9 | sorbic acid | 0.001 | 2.88 | 0.12 | | 94.0:6.0 | 0.18 |
| EX. 10 | sorbic acid | 0.001 | 2.88 | 0.12 | | 94.0:6.0 | 0.11 |
| Comparative EX. 1 | — | — | — | — | — | — | >100 |
| Comparative EX. 2 | sorbic acid | 0.001 | 2.88 | 0.12 | | 94.0:6.0 | 7.51 |
| Comparative EX. 3 | sorbic acid | 0.001 | — | — | | — | 6.12 |
| Comparative EX. 4 | sorbic acid | 0.001 | 3 | — | | 100.0 | 4.33 |
| Comparative EX. 5 | — | — | 2.88 | 0.12 | | 94.0:6.0 | 0.80 |
| Comparative EX. 6 | sorbic acid | 0.001 | 2.88 | 0.12 | | 94.0:6.0 | 3.54 |
| Comparative EX. 7 | sorbic acid | 0.001 | 2.88 | 0.12 | | 94.0:6.0 | —[3] |
| Comparative EX. 8 | sorbic acid | 5 | 2.88 | 0.12 | | 94.0:6.0 | >100 |
| Comparative EX. 9 | sorbic acid | 0.001 | — | — | | — | 4.56 |
| Comparative EX. 10 | sorbic acid | 0.001 | — | 3 | | 3.0:97.0 | 0.82 |

[1] Parts by mass per 100 parts by mass of the total of the polyolefin (A) and the EVOH (B)
[2] Hydrotalcite: $Mg_6Al_2(OH)_{16}CO_3 \cdot 4H_2O$
[3] Film manufacture was impossible due to foaming

TABLE 2

| | Polyolefin (A) | | | | EVOH (B) | | Higher fatty acid metal salt (C) | |
|---|---|---|---|---|---|---|---|---|
| | Type | Amount | Type | Amount | Type | Amount | Type | Amount[1] |
| EX. 11 | PP | 88 | LDPE | 2 | EVOH(B1) | 10 | Calcium stearate | 0.1 |
| EX. 12 | PP | 88 | LDPE | 2 | EVOH(B1) | 10 | Calcium stearate | 0.1 |
| Comparative EX. 11 | PP | 90 | | | EVOH(B3) | 10 | — | — |
| Comparative EX. 12 | PP | 88 | LDPE | 2 | EVOH(B3) | 10 | Calcium stearate | 0.1 |
| Comparative EX. 13 | PP | 88 | LDPE | 2 | EVOH(B1) | 10 | Calcium stearate | 0.1 |
| Comparative EX. 14 | PP | 88 | LDPE | 2 | EVOH(B1) | 10 | — | — |

| | Conjugated polyene compound (D) | | EVAc (E) | S-EVOH (F) | Hydrotalcite (G) | NMR strength ratio | Film surface |
|---|---|---|---|---|---|---|---|
| | Type | Amount[1] | Amount[1] | Amount[1] | Amount[1] | Ja:Jb | appearance[3] |
| EX. 11 | sorbic acid | 0.001 | 2.88 | 0.12 | | 94.0:6.0 | B |
| EX. 12 | sorbic acid | 0.001 | 2.88 | 0.12 | 0.1[2] | 94.0:6.0 | A |
| Comparative EX. 11 | — | | | | | | D |
| Comparative EX. 12 | — | | 2.88 | 0.12 | | 94.0:6.0 | C |
| Comparative EX. 13 | sorbic | 0.001 | — | — | | | C |
| Comparative EX. 14 | sorbic acid | 0.001 | 2.88 | 0.12 | | 94.0:6.0 | C |

[1]Parts by mass per 100 parts by mass of the total of the polyolefin (A) and the EVOH (B)
[2]Hydrotalcite: $Mg_6Al_2(OH)_{16}CO_3 \cdot 4H_2O$
[3]A: No appearance anomalies were found. B: Appearance anomalies were substantially not found, hence practically acceptable.
C: Some appearance anomalies were found, hence practically problematic.
D: Appearance anomalies were clearly found, hence practically problematic.

The present invention relates to a resin composition comprising; polyolefin (A); EVOH (B); higher fatty acid metal salt (C) having 8 to 22 carbon atoms; conjugated polyene compound (D) having a boiling point of 20° C. or higher; EVAc (E); and S-EVOH (F), wherein the mass ratio (A:B) of polyolefin (A) and EVOH (B) is 60:40 to 99.9:0.1, the amount of higher fatty acid metal salts (C) is in the range of 0.0001 to 10 parts by mass per 100 parts by mass of the total of polyolefin (A) and EVOH (B), the amount of conjugated polyene compound (D) is in the range of 0.000001 to 1 part by mass per 100 parts by mass of the total of polyolefin (A) and EVOH (B), and the total amount of EVAc (E) and saponified ethylene-vinyl acetate copolymer (F) is 0.3 part by mass or more per 100 parts by mass of the total of polyolefin (A) and EVOH (B). By using this composition, a poor appearance caused by the EVOH aggregation and flow anomalies attributable to the aggregation can be prevented, and molded articles having an excellent appearance can be obtained.

The invention claimed is:

1. A method for producing a resin composition comprising
preparing a master batch by melt-blending a higher fatty acid metal salt (C) having 8 to 22 carbon atoms, a random copolymer (E) consisting of ethylene and vinyl acetate units, and a saponified ethylene-vinyl acetate copolymer (F) having an ethylene content of 70 to 94 mol % and having a degree of saponification of vinyl acetate units of 40% or more,
melt-blending the master batch, a polyolefin (A), a saponified ethylene-vinyl acetate copolymer (B) having an ethylene content of 20 to 65 mol % and having a degree of saponification of vinyl acetate units of 96% or more, and a conjugated polyene compound (D) having a boiling point of 20° or higher,
wherein a mass ratio (A:B) of the polyolefin (A) and the saponified ethylene-vinyl acetate copolymer (B) is 60:40 to 99.9:0.1,
an amount of the higher fatty acid metal salts (C) is in the range of 0.0001 to 10 parts by mass per 100 parts by mass of the total of the polyolefin (A) and the saponified ethylene-vinyl acetate copolymer (B),
an amount of conjugated polyene compound (D) is in the range of 0.000001 to 1 part by mass per 100 parts by mass of the total of the polyolefin (A) and the saponified ethylene-vinyl acetate copolymer (B), and
a total amount of the ethylene-vinyl acetate copolymer (E) and the saponified ethylene-vinyl acetate copolymer (F) is 0.3 part by mass or more per 100 parts by mass of the total of the polyolefin (A) and the saponified ethylene-vinyl acetate copolymer (B).

2. The method of claim 1, wherein the polyolefin (A) and the saponified ethylene-vinyl acetate copolymer (B) are obtained from scraps of layered products having the polyolefin (A) layer and the saponified ethylene-vinyl acetate copolymer (B) layer.

3. The method of claim 1, wherein a mass ratio (E:F) of the random copolymer (E) and the saponified ethylene-vinyl acetate copolymer (F) is 99.9:0.1 to 70.0:30.0.

4. The method of claim 1, wherein the master batch further comprises the polyolefin (A).

5. The method of claim 1, wherein the master batch analyzed by nuclear magnetic resonance spectroscopy ($^1$H-NMR) method shows a signal strength ratio (Ja:Jb) of a signal Ja deriving from hydrogen atoms bonded to carbon atoms to which acetoxy groups are bonded, and a signal Jb deriving from hydrogen atoms bonded to carbon atoms to which hydroxyl groups are bonded, in the range of 99.5:0.5 to 70.0:30.0.

6. The method of claim 1, wherein the master batch further comprises a hydrotalcite (G), wherein the resin composition contains 0.0001 to 10 parts by mass hydrotalcite (G) per 100 parts by mass of the total of the polyolefin (A) and the saponified ethylene-vinyl acetate copolymer (B).

7. A method for producing a multilayer structure comprising co-extrusion molding, at least, the resin composition produced by the method of claim 1 and a saponified ethylene-vinyl acetate copolymer having an ethylene content of 20 to 65 mol % and having a degree of saponification of the vinyl acetate units of 96% or more, wherein the multilayer structure comprises at least a layer made of the resin composition and a layer made of the saponified ethylene-vinyl acetate copolymer.

* * * * *